(12) United States Patent
Petersen

(10) Patent No.: US 11,732,980 B2
(45) Date of Patent: Aug. 22, 2023

(54) PORT CONNECTION FOR A HEAT EXCHANGER

(71) Applicant: SPX Flow, Inc., Charlotte, NC (US)

(72) Inventor: Jes Hansen Petersen, Kolding (DK)

(73) Assignee: SPX Flow, Inc., Charlotte, NC (US)

( * ) Notice: Subject to any disclaimer, the term of this patent is extended or adjusted under 35 U.S.C. 154(b) by 0 days.

(21) Appl. No.: 17/014,319

(22) Filed: Sep. 8, 2020

(65) Prior Publication Data
US 2020/0400388 A1    Dec. 24, 2020

Related U.S. Application Data

(63) Continuation of application No. 14/870,264, filed on Sep. 30, 2015, now abandoned.

(51) Int. Cl.
*F28F 9/02* (2006.01)
*F28F 3/08* (2006.01)
(Continued)

(52) U.S. Cl.
CPC .......... *F28F 9/0246* (2013.01); *F16L 41/086* (2013.01); *F28D 9/005* (2013.01);
(Continued)

(58) Field of Classification Search
CPC ......... F16L 5/02; F16L 19/0218; F16L 23/06; F16L 23/08; F16L 23/10; F16L 23/18; F16L 41/086; F28F 9/005; F28F 9/0246; F28F 9/0256; F28F 9/04; F28F 9/08; F28F 9/083; F28F 9/10; F28F 9/12; F28D 9/005
See application file for complete search history.

(56) References Cited

U.S. PATENT DOCUMENTS 3,997,193 A    12/1976    Tsuda et al.
4,497,511 A     2/1985    Barker
(Continued)

FOREIGN PATENT DOCUMENTS

CN        1503893 A     6/2004
CN      101006318 A     7/2007
(Continued)

OTHER PUBLICATIONS

British Columbia Safety Authority (Publication1 ), Approved Application for Registration of Plate Heat Exchanger Design, 9 pgs., Sep. 4, 2009, British Columbia.
(Continued)

*Primary Examiner* — Eric S Ruppert
*Assistant Examiner* — Hans R Weiland
(74) *Attorney, Agent, or Firm* — IceMiller LLP

(57) ABSTRACT

A port connection includes a first element, a second element, and a seal. The first element has a first sleeve and a first flange. The first sleeve is configured to slide into a port disposed through a pressure plate of the plate heat exchanger and the first flange having a first bearing surface to bear upon a first face of the pressure plate. The second element has a second sleeve and a second flange. The second sleeve is configured to slide into the port and the second flange having a second bearing surface to bear upon a second face of the pressure plate. The seal is generated in response to the first sleeve telescoping into the second sleeve.

3 Claims, 4 Drawing Sheets

(51) Int. Cl.
*F28D 9/00* (2006.01)
*F16L 41/08* (2006.01)

(52) U.S. Cl.
CPC ............ *F28F 3/083* (2013.01); *F28F 9/0256* (2013.01); *F28F 2275/20* (2013.01); *F28F 2275/205* (2013.01); *F28F 2280/06* (2013.01)

(56) References Cited

U.S. PATENT DOCUMENTS

| | | | | |
|---|---|---|---|---|
| 4,589,480 | A | * | 5/1986 | Dahlgren ................ F28F 3/083 165/146 |
| 4,699,212 | A | | 10/1987 | Andersson et al. |
| 4,848,451 | A | * | 7/1989 | Jonsson .................. F28F 3/083 165/167 |
| 6,073,687 | A | * | 6/2000 | Jensen .................... F28F 3/083 165/166 |
| 6,775,909 | B2 | * | 8/2004 | Jonsson ................ F28F 19/002 165/167 |
| 6,869,107 | B2 | * | 3/2005 | Schroeder ............... F16L 21/08 285/124.4 |
| 2004/0080159 | A1 | | 4/2004 | Schroeder et al. |
| 2004/0111864 | A1 | | 6/2004 | Skinner et al. |
| 2009/0159251 | A1 | * | 6/2009 | Blomgren ............... F28F 3/083 165/167 |
| 2010/0300651 | A1 | * | 12/2010 | Kumar ...................... F28F 3/10 165/70 |
| 2014/0131020 | A1 | * | 5/2014 | Blomgren ............... F28D 9/005 165/166 |
| 2014/0338870 | A1 | * | 11/2014 | Hiwatashi ............... F28D 9/005 165/166 |

FOREIGN PATENT DOCUMENTS

| | | |
|---|---|---|
| CN | 101294760 A | 10/2008 |
| CN | 102985779 A | 3/2013 |
| CN | 103620334 A | 3/2014 |
| GB | 1269499 A | 4/1972 |

OTHER PUBLICATIONS

Service de l'inspection de la fabrication D'appareils sous pression (Publication 2), Approved Application for Registration of Plate Heat Exchanger Design, 8 pgs., Dec. 13, 2011, Quebec.

* cited by examiner

PORT CONNECTION FOR A HEAT EXCHANGER

CROSS-REFERENCE TO RELATED APPLICATIONS

This application claims priority to and is a continuation of U.S. patent application Ser. No. 14/870,264, filed Sep. 30, 2015, the disclosure of which is hereby incorporated by reference in its entirety.

FIELD OF THE INVENTION

The present invention relates generally to a plate heat exchanger. More particularly, the present invention relates to a port connection for use on a plate heat exchanger.

BACKGROUND OF THE INVENTION

Plate heat exchangers offer efficient transfer of heat from one fluid to another in a relatively small volume. Heat exchangers are typically assembled from a multitude of individual or welded pairs of plates called a plate pack that are sealed around an outer edge with a gasket material. The plate pack is compressed in a frame of the heat exchanger in order to form the seal between the plates or plate pairs. The plate pack includes inlets and outlets for the two fluids.

The compression is applied uniformly across the surface of the plate pack in order to prevent leakage from the seal and reduce damage to the plates. Because of the size of the plate pack and the amount of pressure applied, the plate pack is sandwiched between two pressure plates called the head and follower that are used to distribute the load evenly. In order to supply this pressure uniformly, the pressure plates are typically formed from thick slabs of metal.

In order to access the inlets and outlets of the plate pack, the pressure plates include ports aligned with the inlets and outlets. For some applications, the ports may be unlined and one or both fluid may directly contact the metal of the pressure plates. In other instances, the ports may be lined with port connectors. The port connectors may be elastomeric or corrosion-resistant metal for example. Unfortunately, these conventional port connects suffer from a number of shortcomings. For example, elastomeric port connections are less resistant to heat and degrade relatively faster than the life of the plate heat exchanger. Metal port connections are more durable than elastomeric port connections but are more difficult to install. A conventional metal port connection installation method includes hydroforming or welding. These methods are labor intensive, time consuming and/or require specific tooling for each size of port.

Accordingly, there is a need for reducing expense and time of installing port connections to address the problems described above and/or problems posed by other conventional approaches.

SUMMARY OF THE INVENTION

Embodiments of the present disclosure are capable of reducing the expense and time of installing port connections in a heat exchanger, at least to some extent.

An embodiment of the invention pertains to a port connection for a plate heat exchanger. The port connection includes a first element, a second element, and a seal. The first element has a first sleeve and a first flange. The first sleeve is configured to slide into a port disposed through a pressure plate of the plate heat exchanger and the first flange having a first bearing surface to bear upon a first face of the pressure plate. The second element has a second sleeve and a second flange. The second sleeve is configured to slide into the port and the second flange having a second bearing surface to bear upon a second face of the pressure plate. The seal is generated in response to the first sleeve telescoping into the second sleeve.

Another embodiment of the invention relates to a pressure plate for a plate heat exchanger. The pressure plate includes, a first face, a second face, and a plurality of port connections. The first face is configured to bear upon a plate pack. The plurality of port connections are disposed in a respective plurality of ports through the pressure plate to fluidly access the plate pack. Each port connection includes a first element, a second element, and a seal. The first element has a first sleeve and a first flange. The first sleeve is configured to slide into the respective port and the first flange has a first bearing surface to bear upon the first face. The second element has a second sleeve and a second flange. The second sleeve is configured to slide into the respective port and the second flange has a second bearing surface to bear upon the second face. The seal is generated in response to the first sleeve telescoping into the second sleeve.

Yet another embodiment of the invention relates to a plate heat exchanger. The plate heat exchanger includes a plate pack, a pair of pressure plates, and a frame. The plate pack has a first inlet for a first fluid, a first outlet for the first fluid, a second inlet for a second fluid, and a second outlet for the second fluid. The plate pack is configured to direct a flow of the first fluid in thermal contact with a flow of the second fluid. One or both of the pair of pressure plates includes, a first face, a second face, and a plurality of port connections. The first face is configured to bear upon the plate pack. The plurality of port connections are disposed in a respective plurality of ports through the pressure plate to fluidly access the plate pack. Each port connection includes a first element, a second element, and a seal. The first element has a first sleeve and a first flange. The first sleeve is configured to slide into the respective port and the first flange has a first bearing surface to bear upon the first face. The second element has a second sleeve and a second flange. The second sleeve is configured to slide into the respective port and the second flange has a second bearing surface to bear upon the second face. The seal is generated in response to the first sleeve telescoping into the second sleeve. The frame is to compress the plate pack between the pressure plates.

Still another embodiment of the invention relates to a port connection for a plate heat exchanger. The port connection includes a first element having a first sleeve and a first flange, the first sleeve being configured to slide into a port disposed through a pressure plate of the plate heat exchanger, and the first flange having a first bearing surface and a first sealing surface, the first bearing surface configured to bear directly upon a first face of the pressure plate, and the first sealing surface disposed annularly about the first flange and configured to form a seal with a first heat exchange plate in a plate pack of the plate heat exchanger. The port connection includes a first gasket entirely disposed between the first sealing surface of the first flange and the first heat exchange plate, the first gasket configured to bear directly upon the first heat exchange plate and prevent the first heat exchange plate from contacting the first flange, and the first gasket configured to prevent the first heat exchange plate from contacting the pressure plate at the port, wherein the first flange is sandwiched between the first gasket and the pressure plate with the first gasket directly bearing upon the first sealing surface of the first flange and the pressure plate directly bearing upon the first bearing surface of the first flange. The port connection comprises a second element having a second sleeve and a second flange, the second sleeve being configured to slide into the port and the second flange having a second bearing surface to bear upon a second face of the pressure plate, a seal generated in response to the first sleeve telescoping into the second sleeve, as well as a pair of annular grooves disposed about the first sleeve to provide a pair of seats for a pair of O-rings, the O-rings being configured to form the seal between the pair of seats and an inner surface of the second sleeve.

Another embodiment of the invention relates to a pressure plate for a plate heat exchanger. The pressure plate includes a first face configured to bear upon a plate pack, a second face and a plurality of port connections disposed in a respective plurality of ports through the pressure plate to fluidly access the plate pack. Each port connection includes a first element having a first sleeve and a first flange, the first sleeve being configured to slide into the respective port and the first flange having a first bearing surface to bear directly upon the first face, a first sealing surface disposed annularly about the first flange and configured to form a seal with a first heat exchange plate in the plate pack of the plate heat exchanger, a first gasket entirely disposed between the first sealing surface and the first heat exchange plate, the first gasket configured to bear directly upon the first heat exchange plate and prevent the first heat exchange plate from contacting the first flange, and the first gasket configured to prevent the first heat exchange plate from contacting the pressure plate at the port, wherein the first flange is sandwiched between the first gasket and the pressure plate with the first gasket directly bearing upon the first sealing surface and the first face directly bearing upon the first bearing surface, a second element having a second sleeve and a second flange, the second sleeve being configured to slide into the respective port and the second flange having a second bearing surface to bear upon the second face, a seal generated in response to the first sleeve telescoping into the second sleeve, and a pair of annular grooves disposed about the first sleeve to provide a pair of seats for a pair of O-rings, the O-rings being configured to form the seal between the pair of seats and an inner surface of the second sleeve.

Yet another embodiment of the invention relates to a plate heat exchanger includes a plate pack having a first inlet for a first fluid, a first outlet for the first fluid, a second inlet for a second fluid, and a second outlet for the second fluid, wherein the plate pack is configured to direct a flow of the first fluid in thermal contact with a flow of the second fluid. The plate heat exchanger includes a pair of pressure plates, one or both of the pair of pressure plates includes a first face configured to bear upon the plate pack, a second face, a plurality of ports, each port being disposed in cooperative alignment with respective ones of the first inlet, the first outlet, the second inlet, and the second outlet, and a plurality of port connections, each port connection being disposed in a respective port of the plurality of ports. Each port connection includes a first element having a first sleeve and a first flange, the first sleeve being configured to slide into the respective port and the first flange having a first bearing surface to bear directly upon the first face, a first sealing surface disposed annularly about the first flange and configured to form a seal with a first heat exchange plate in the plate pack of the plate heat exchanger, a first gasket entirely disposed between the first sealing surface and the first heat exchange plate, the first gasket configured to bear directly upon the first heat exchange plate and prevent the first heat exchange plate from contacting the first flange, and the first gasket configured to prevent the first heat exchange plate from contacting the pressure plate at the port, wherein the first flange is sandwiched between the first gasket and one of the pair of pressure plates with the first gasket directly bearing upon the first sealing surface and the first face directly bearing upon the first bearing surface, a second element having a second sleeve and a second flange, the second sleeve being configured to slide into the respective port and the second flange having a second bearing surface to bear upon the second face, a pair of annular grooves disposed about the first sleeve to provide a pair of seats for a pair of O-rings, the O-rings being configured to form the seal between the pair of seats and an inner surface of the second sleeve, and a seal generated in response to the first sleeve telescoping into the second sleeve, and a frame to compress the plate pack between the pressure plates.

There has thus been outlined, rather broadly, the more important features of the invention in order that the detailed description thereof that follows may be better understood, and in order that the present contribution to the art may be better appreciated. There are, of course, additional features of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

The drawings presented are intended solely for the purpose of illustration and therefore, are neither desired nor intended to limit the subject matter of the disclosure to any or all of the exact details of construction shown, except insofar as they may be deemed essential to the claims.

DETAILED DESCRIPTION OF PREFERRED EMBODIMENTS OF THE INVENTION

In general, embodiments of the invention pertain to a port connection for a heat exchanger that is easier to install and/or maintain than conventional port connections and/or offers cost savings over conventional port connections and a method of assembling the improved port connection in port of a pressure plate of the heat exchanger. In addition to ease of installation, improved maintenance, and reduced cost of the improved port connection described herein, tooling and machine costs are reduced by omitting welding and/or hydroforming associated with conventional port connection installation.

Figure 1:
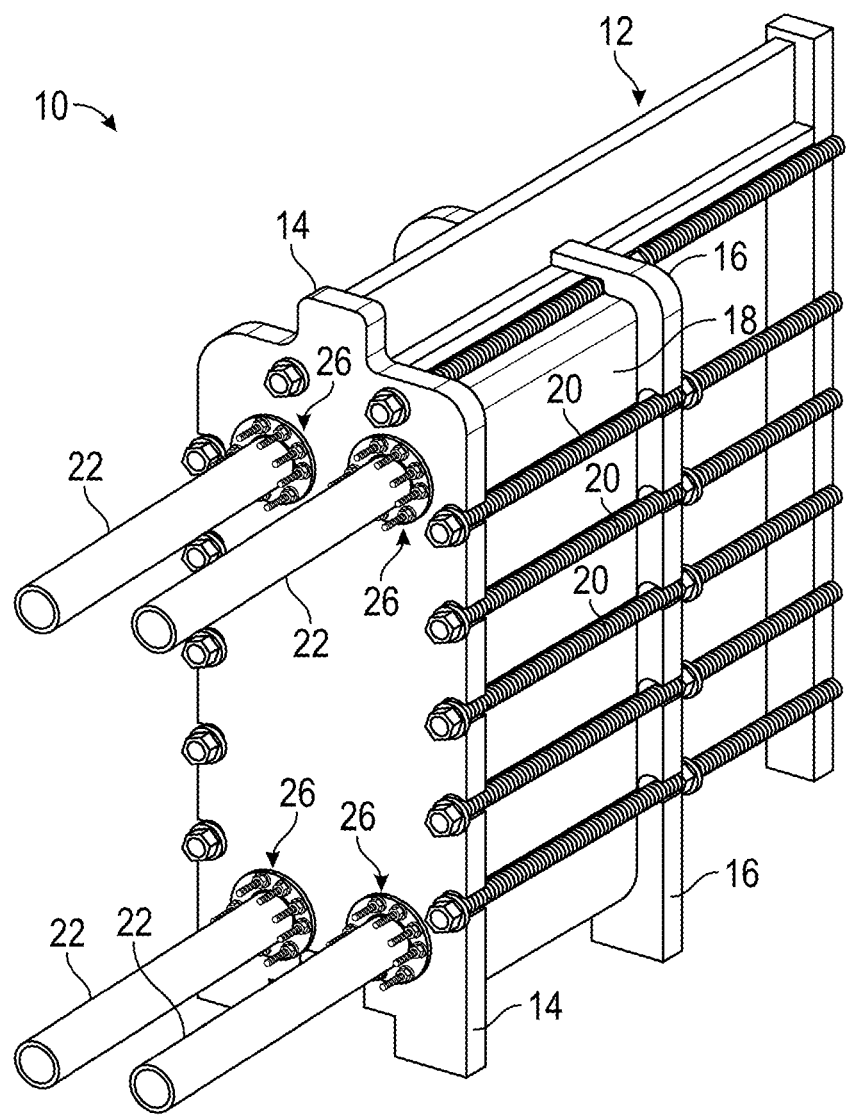
FIG. 1 is a perspective view of a heat exchanger suitable for use with embodiment of the invention.

Referring now to the figures wherein like reference numerals indicate like elements, in FIG. 1 is a perspective view of a heat exchanger 10 suitable for use with embodiment of the invention. As shown in FIG. 1, the heat exchanger 10 includes a frame 12 having a pair of pressure plates 14 and 16, a plate pack 18, a plurality of tie bar assemblies 20 and a plurality of supply/output conduits 22. The frame 12 is configured to retain and compress the plate pack 18 between the pair of pressure plates 14 and 16.

The pair of pressure plate 14 and 16 are also, more particularly referred to as a head (pressure plate 14) and a follower (pressure plate 16). To circulate fluids through the plate pack 18, the supply/output conduits 22 are secured in fluid communication with a plurality of ports 26 (shown in FIGS. 2 and 4). While the supply/output conduits 22 are shown affixed to the pressure plate 14, in other examples, some or all of the supply/output conduits 22 along with the respective ports 26 may be disposed on the pressure plate 16.

Figure 2:
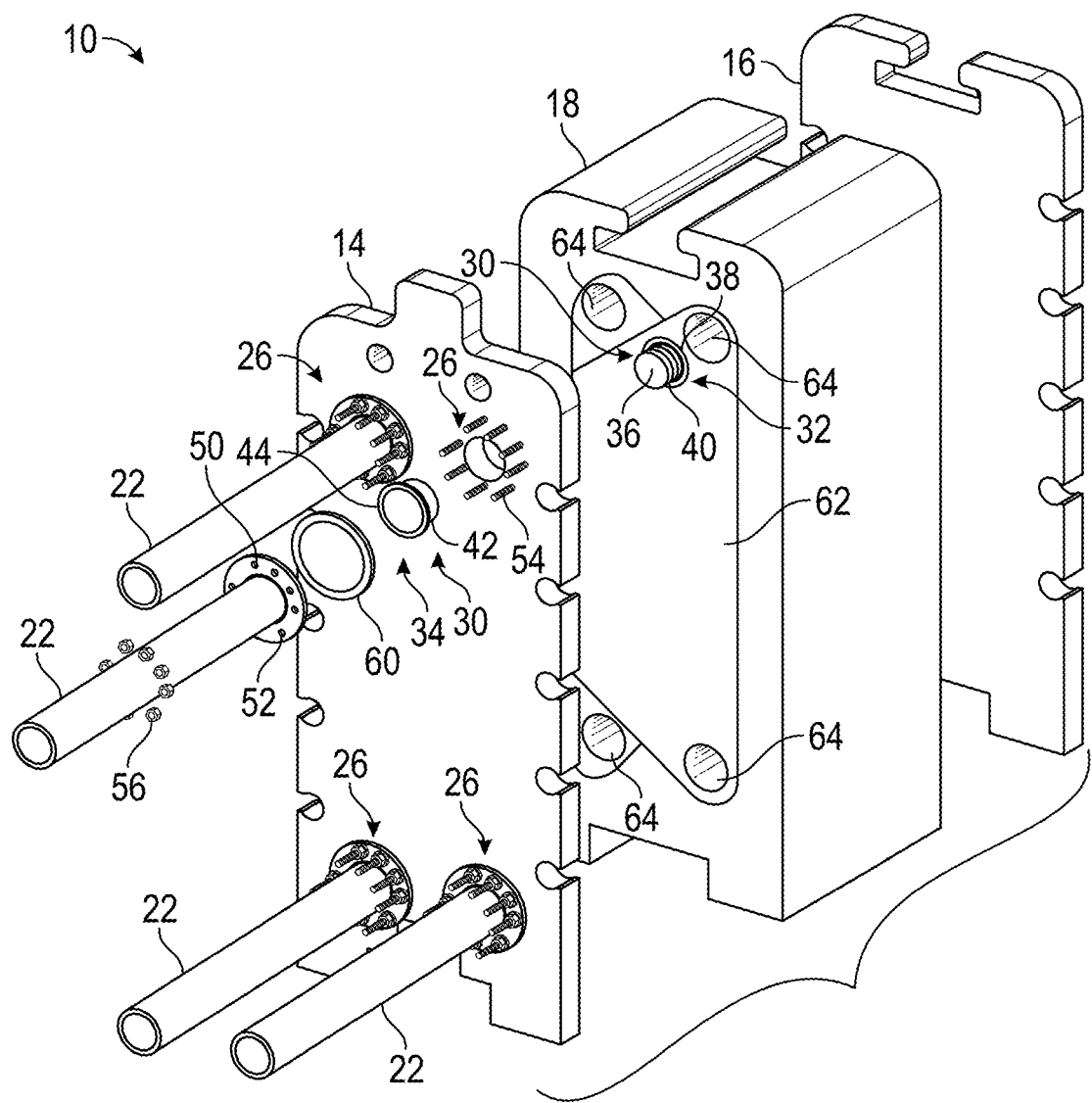
FIG. 2 is a partially exploded view of the heat exchanger in accordance with an embodiment of the invention.

FIG. 2 is a partially exploded view of the heat exchanger 10 in accordance with an embodiment of the invention. As shown in FIG. 2, the heat exchanger 10 includes a plurality of port connections 30 are disposed in the plurality of ports 26. As described herein, each port connection 30 includes a first element 32 and a second element 34. The first element 32 includes a first sleeve 36, a first flange 38, and a seal 40. In the particular example, the seal 40 includes one or more O-rings. However, in other examples, the seal 40 may include any suitable number or type of sealing member. The second element 34 includes a second sleeve 42 and a second flange 44.

Figure 4:
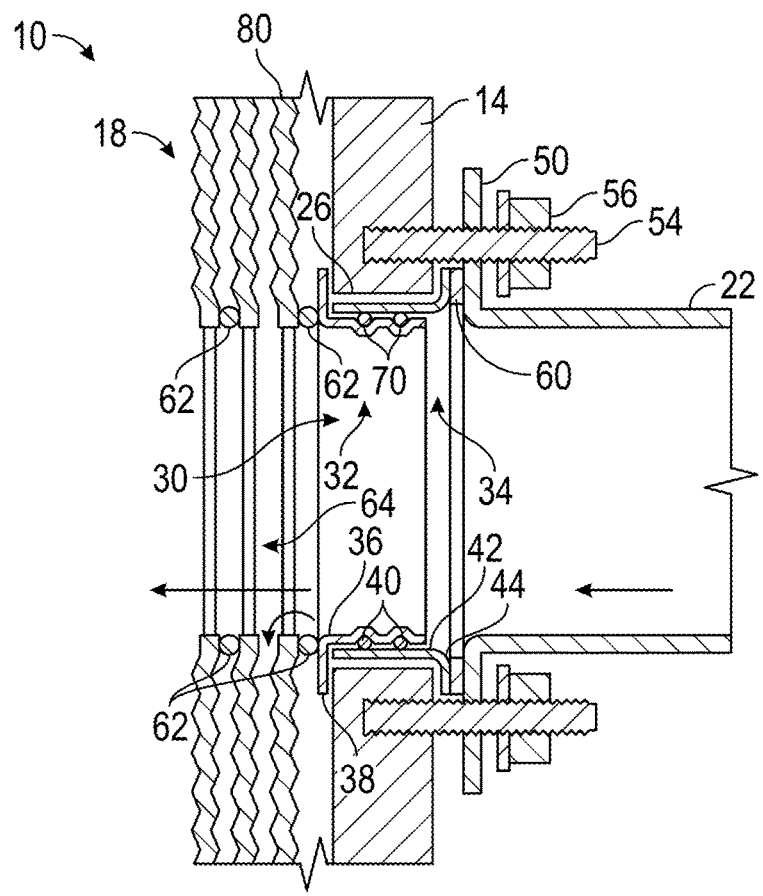
FIG. 4 is a cross sectional view 4-4 of a port connection installed in the heat exchanger in accordance with an embodiment of the invention.

As described herein, the port connection 30 is installed in port 26 by sliding or telescoping the first element 32 into the second element 34 and the seal 40 form a seal between the first sleeve 36 and the second sleeve 42 so that a liner is formed within the port 26. The assembled port connection 30 is shown in FIG. 4.

The supply/output conduit 22 is assembled on the heat exchanger 10 by securing the supply/output conduit 22 in cooperative alignment with the port connection 30. In a particular example, the supply/output conduit 22 includes a flange 50 with a series of bolt holes 52. These bolt holes 52 are aligned with a respective series of threaded studs 54 protruding from the pressure plate 14 and a plurality of nuts 56 are threaded onto the studs 54 to secure the supply/output conduit 22. Optionally, a gasket 60 may be disposed between the flange 50 and the second flange 44.

Also shown in FIG. 2, the plate pack 18 includes a gasket 62. The gasket 62 include a portion disposed about the perimeter of the plate pack 18 as well as portions that selectively seal a plurality of inlets/outlet 64 in the plate pack 18. As is generally understood, this selective sealing of the plurality of inlets/outlet 64 is used to control the flow of two different fluids in the plate pack 18 in order to transfer heat from one fluid to the other.

An advantage of the port connection 30 is that the port connection 30 may be serviced without removing the supply/output conduit 22. For example, the plate pack 18 is routinely serviced as a general maintenance procedure and during this procedure and/or at other time, the plate pack 18 can be decompressed and moved away from the pressure plate 14 so that the first element 32 may be inspected. Inspection can be in-place and/or include removal. For example, the first element 32 may be slid out from the port 26 and the first sleeve 36, first flange 38, and/or seal 40 may be inspected. The seal 40 can be replaced if worn or otherwise damaged and the first element 32 can be slid back into the port 26 to telescope into the second sleeve 42 and form a seal therewith.

Figure 3:
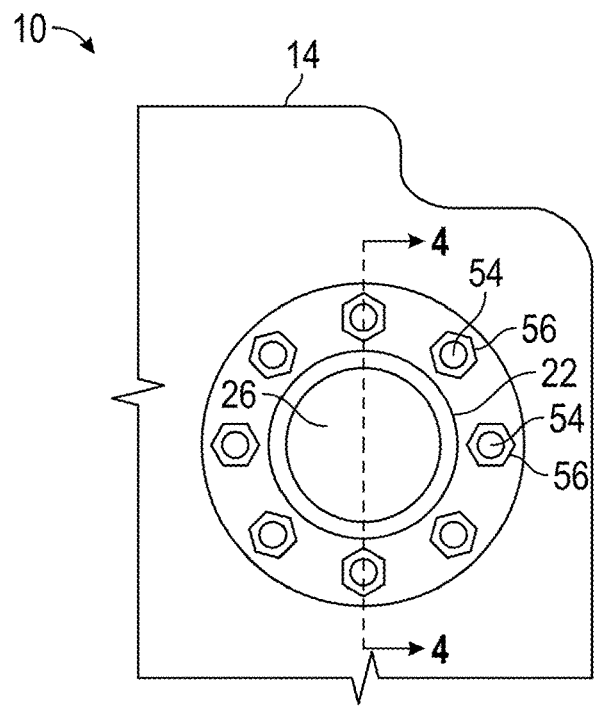
FIG. 3 is a front view of a portion of the heat exchanger in accordance with an embodiment of the invention.

FIG. 3 is a front view of a portion of the heat exchanger 10 in accordance with an embodiment of the invention. As shown in FIG. 3, when assembled, the supply/output conduit 22 is disposed on cooperative alignment with the port 26.

FIG. 4 is a cross sectional view 4-4 of the port connection 30 installed in the heat exchanger 10 in accordance with an embodiment of the invention. As shown in FIG. 4, the first element 32 is telescoped into the second element 34 and the seal 40 form a seal between the first sleeve 36 and the second sleeve 42 so that a liner is formed within the port 26. In this manner, fluid flowing through the port 26 does not come in contact with the port 26 but rather, the port connection 30 provides a liner that acts as a barrier between the port 26 and the fluid. In this regard, the port connection 30 may include a relatively inert material or layer. For example, the first element 32 and/or the second element 34 may include a stainless steel such as American Iron and Steel Institute (AISI) 316L, titanium, and the like.

The first sleeve 36 is configured to slide into or telescope into the second sleeve 42. In addition, the first sleeve 36 and the second sleeve 42 are sized such that the seal 40 is compressed therebetween to form a seal. In this manner, the seal formed by the compression of the O-ring between the first sleeve 36 and the second sleeve 42 is configured to reduce or prevent leakage of the fluid in the port 26 from coming in contact with the port 26 surface. In this regard, the material forming or coating the seal 40 may include any suitable material. In general, the material for the seal 40 is selected to withstand the thermal and/or chemical nature of the environment in port connection 30. Particular examples of suitable materials to form or coat the seal 40 include nitrile butadiene rubber (NBR), ethylene propylene diene monomer (M-class) rubber (EPDM), fluoroelastomeric rubber having vinylidene fluoride as a monomer (FKM), and the like.

Also shown in FIG. 4, the first sleeve 36 includes one or more seats 70 to retain the seal 40 in position. For example, the seats 70 may include annular grooves disposed about the first sleeve 36. Although two seat 70 are shown, the number of seats and corresponding seal 40 may vary to include any suitable number. For example, the first sleeve 36 may include one, two, three, four, or more seats 70 and corresponding seal 40.

As shown in FIG. 4, the plate pack 18 includes a plurality of pairs or individual plates 80 and the gaskets 62 are disposed between alternating plates 80 to generate the flow of alternating fluids to transfer heat from one fluid to the other.

Figure 5:
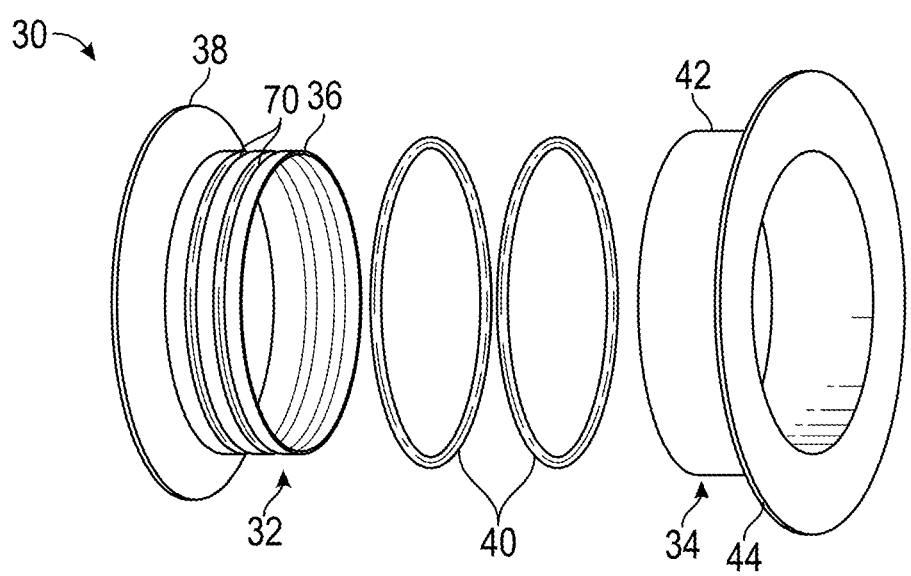
FIG. 5 is an exploded view of the port connection in accordance with an embodiment of the invention.

FIG. 5 is an exploded view of the port connection 30 in accordance with an embodiment of the invention. As shown in FIG. 5, the port connection 30 includes the first element 32 and the second element 34. The first element 32 includes the first sleeve 36, the first flange 38, and the seal 40. The first sleeve 36 includes the seats 70 to retain the seal 40. The second element 34 includes the second sleeve 42 and a second flange 44.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A port connection for a plate heat exchanger, the port connection consisting of:
    a first element having a first sleeve and a first flange, the first sleeve being configured to slide into a port disposed through a pressure plate of the plate heat exchanger, and the first flange having a first bearing surface and a first sealing surface, the first bearing surface configured to bear directly upon a first face of the pressure plate, and the first sealing surface disposed annularly about the first flange and configured to form a seal with a first heat exchange plate in a plate pack of the plate heat exchanger;
    a first gasket entirely disposed between the first sealing surface of the first flange and the first heat exchange plate, the first gasket configured to bear directly upon the first heat exchange plate and prevent the first heat exchange plate from contacting the first flange, and the first gasket includes a first portion disposed about a perimeter of the first heat exchange plate as well a second portion that selectively seal the port in the first heat exchange plate, the first gasket being configured to prevent the first heat exchange plate from contacting the pressure plate at the port, wherein the first flange is sandwiched between the first gasket and the pressure plate with the first gasket directly bearing upon the first sealing surface of the first flange and the pressure plate directly bearing upon the first bearing surface of the first flange;
    a second element having a second sleeve and a second flange, the second sleeve being configured to slide into the port and the second flange having a second bearing surface to bear upon a second face of the pressure plate;
    a seal generated in response to the first sleeve telescoping into the second sleeve; and
    a pair of annular grooves disposed about the first sleeve to provide a pair of seats for a pair of O-rings, the O-rings being configured to form the seal between the pair of seats and an inner surface of the second sleeve;
    a second sealing surface disposed annularly about the second flange and configured to form a seal with a supply/output conduit; and
    a second gasket disposed between the second sealing surface and the supply/output conduit.

2. A pressure plate for a plate heat exchanger, the pressure plate consisting of:
    a first face configured to bear upon a plate pack;
    a second face; and
    a plurality of port connections disposed in a respective plurality of ports through the pressure plate to fluidly access the plate pack, each port connection comprising:
        a first element having a first sleeve and a first flange, the first sleeve being configured to slide into the respective port and the first flange having a first bearing surface to bear directly upon the first face;
        a first sealing surface disposed annularly about the first flange and configured to form a seal with a first heat exchange plate in the plate pack of the plate heat exchanger;
        a first gasket entirely disposed between the first sealing surface and the first heat exchange plate, the first gasket includes a first portion disposed about a perimeter of the first heat exchange plate as well a second portion that selectively seal the port in the first heat exchange plate, the first gasket being configured to bear directly upon the first heat exchange plate and prevent the first heat exchange plate from contacting the first flange, and the first gasket configured to prevent the first heat exchange plate from contacting the pressure plate at the port, wherein the first flange is sandwiched between the first gasket and the pressure plate with the first gasket directly bearing upon the first sealing surface and the first face directly bearing upon the first bearing surface;
        a second element having a second sleeve and a second flange, the second sleeve being configured to slide into the respective port and the second flange having a second bearing surface to bear upon the second face,
        a seal generated in response to the first sleeve telescoping into the second sleeve; and
        a pair of annular grooves disposed about the first sleeve to provide a pair of seats for a pair of O-rings, the O-rings being configured to form the seal between the pair of seats and an inner surface of the second sleeve;
        a second sealing surface disposed annularly about the second flange and configured to form a seal with a supply/output conduit; and
        a second gasket disposed between the second sealing surface and the supply/output conduit.

3. A plate heat exchanger consisting of:
    a plate pack having a first inlet for a first fluid, a first outlet for the first fluid, a second inlet for a second fluid, and a second outlet for the second fluid, wherein the plate pack is configured to direct a flow of the first fluid in thermal contact with a flow of the second fluid;
    a pair of pressure plates, one or both of the pair of pressure plates includes:
        a first face configured to bear upon the plate pack;
        a second face;
        a plurality of ports, each port being disposed in cooperative alignment with respective ones of the first inlet, the first outlet, the second inlet, and the second outlet;
        a plurality of port connections, each port connection being disposed in a respective port of the plurality of ports, each port connection comprising:
        a first element having a first sleeve and a first flange, the first sleeve being configured to slide into the respective port and the first flange having a first bearing surface to bear directly upon the first face;
        a first sealing surface disposed annularly about the first flange and configured to form a seal with a first heat exchange plate in the plate pack of the plate heat exchanger;
        a first gasket entirely disposed between the first sealing surface and the first heat exchange plate, the first gasket configured to bear directly upon the first heat exchange plate and prevent the first heat exchange plate from contacting the first flange, and the first gasket includes a first portion disposed about a perimeter of the first heat exchange plate as well a second portion that selectively seal the port in the first heat exchange plate, the first gasket being configured to prevent the first heat exchange plate from contacting the pressure plate at the port, wherein the first flange is sandwiched between the first gasket and one of the pair of pressure plates with the first gasket directly bearing upon the first sealing surface and the first face directly bearing upon the first bearing surface;

a second element having a second sleeve and a second flange, the second sleeve being configured to slide into the respective port and the second flange having a second bearing surface to bear upon the second face, a pair of annular grooves disposed about the first sleeve to provide a pair of seats for a pair of O-rings, the O-rings being configured to form the seal between the pair of seats and an inner surface of the second sleeve; and a seal generated in response to the first sleeve telescoping into the second sleeve; and a frame to compress the plate pack between the pressure plates;

a second sealing surface disposed annularly about the second flange and configured to form a seal with a supply/output conduit; and a second gasket disposed between the second sealing surface and the supply/output conduit.

* * * * *